United States Patent
Fomitchov et al.

(10) Patent No.: US 8,053,711 B2
(45) Date of Patent: Nov. 8, 2011

(54) SYSTEM AND METHOD FOR ADJUSTING THE SPHERICAL ABERRATION OF OBJECTIVE LENSES

(75) Inventors: Pavel A. Fomitchov, New York, NY (US); Kaushal Verma, Franklin Park, NJ (US); Joseph Masino, Howell, NJ (US)

(73) Assignee: GE Healthcare Bio-Sciences Corp., Piscataway, NJ (US)

( * ) Notice: Subject to any disclaimer, the term of this patent is extended or adjusted under 35 U.S.C. 154(b) by 286 days.

(21) Appl. No.: 12/523,066

(22) PCT Filed: Jan. 28, 2008

(86) PCT No.: PCT/US2008/052158
§ 371 (c)(1),
(2), (4) Date: Jul. 14, 2009

(87) PCT Pub. No.: WO2008/100695
PCT Pub. Date: Aug. 21, 2008

(65) Prior Publication Data
US 2010/0033812 A1   Feb. 11, 2010

Related U.S. Application Data

(60) Provisional application No. 60/889,042, filed on Feb. 9, 2007.

(51) Int. Cl.
*G02B 7/04* (2006.01)

(52) U.S. Cl. ................. 250/201.3; 250/208.1
(58) Field of Classification Search ............... 250/208.1, 250/201.3, 396 R, 396 ML, 311, 306, 307; 359/383, 821; 356/515–520
See application file for complete search history.

(56) References Cited

U.S. PATENT DOCUMENTS

| | | | |
|---|---|---|---|
| 6,191,423 B1 * | 2/2001 | Krijn et al. | 250/396 R |
| 6,605,810 B1 | 8/2003 | Haider et al. | |
| 6,934,226 B2 | 8/2005 | Yasuda et al. | |
| 2006/0176548 A1 | 8/2006 | Terada et al. | |

* cited by examiner

*Primary Examiner* — Que T Le

(57) ABSTRACT

A spherical aberration adjustment system is disclosed, which includes a plurality of objective lenses, where at least one of the plurality of objective lenses has a spherical aberration collar. The plurality of objective lenses are mounted onto an objective holder, where the objective holder is configured to place the at least one of the plurality of objective lenses in an imaging position. A driving mechanism is coupled by a mechanical link to the at least one of the plurality of objective lenses, where the mechanical link is configured to transmit motion from the driving mechanism to the spherical aberration collar. A control system is configured to manipulate the driving mechanism to move the spherical aberration collar of the at least one of the plurality of objective lenses in the imaging position to a specific spherical aberration adjustment setting.

15 Claims, 7 Drawing Sheets

SYSTEM AND METHOD FOR ADJUSTING THE SPHERICAL ABERRATION OF OBJECTIVE LENSES

CROSS-REFERENCE TO RELATED APPLICATIONS

This application is a filing under 35 U.S.C. §371 and claims priority to international patent application number PCT/US2008/052158 filed Jan. 28, 2008, published on Aug. 21, 2008, as WO 2008/100695, which claims priority to United States provisional patent application No. 60/889,042 filed Feb. 9, 2007; the disclosure of which is incorporated herein by reference in its entirety.

FIELD OF THE INVENTION

This invention relates to a system and method for adjusting the spherical aberration setting of objective lenses for microscope systems.

BACKGROUND OF THE INVENTION

When researching tiny region of interest on a sample, researchers often employ a microscope to observe the sample. The microscope may be a conventional wide-field, fluorescent or confocal microscope. The optical configuration of such a microscope typically includes a light source, illumination optics, objective lens, sample holder, imaging optics and a detector. Light from the light source illuminates the region of interest on the sample after propagating through the illumination optics and the objective lens. Microscope objective forms a magnified image of the object that can be observed via eyepiece, or in case of a digital microscope, the magnified image is captured by the detector and sent to a computer for live observation, data storage, and further analysis. It is clear that in such a configuration, the objective lens forms a critical part of the microscope.

Many samples can be viewed directly by a microscope, that is, there is no optical material between the objective lens and the sample. However, in several other imaging configurations, such as inverted or epi-fluorescent microscope, samples are viewed through glass cover slips, glass slides and bottom plate of sample holders (e.g., Petri dishes, micro titer plates). Typically, commercially available objective lenses are designed for a specific thickness of such sample holders or covers, such as 0.17 mm microscope cover slip. When a sample holder with different thickness of bottom plate is used, the deviation from specified thickness causes significant degradation of an image quality due to spherical aberration introduced by a sample holder. A correction collar may be provided in the design on objective lens, which allows for compensation of the spherical aberration when sample is imaged through sample support of different thicknesses. In general laboratory practice, the researcher using the microscope adjusts a spherical aberration correction setting by: (1) manual rotation of the collar, while observing the live image on the computer screen, (2) setting the collar to a known sample holder thickness using a scale placed on the microscope objective.

For an automated microscope system, it is not always able to access the objective lenses to correct spherical aberration setting of the objective lens. The user's ability to access the objective lenses to correct spherical aberration setting may be restricted due to laser safety regulation for a laser scanning microscope, or the physical access may be limited due to a self-enclosed design automated microscope (i.e. if the objective lens is located in the middle of the instrument and is surrounded by other components of the microscope).

The utilization of a motorized (or automated) spherical aberration correction system in a microscope will enable a user to simply and effectively correct spherical aberration of objective lenses in order to obtain a clear image of the sample. Therefore, there is a need for a system and method that enables the user to adjust the spherical aberration correction setting of objective lenses, or to perform the imaging of multiple samples that require different setting of spherical aberration correction in an automated mode.

BRIEF SUMMARY OF THE INVENTION

The present invention has been accomplished in view of the above-mentioned technical background, and it is an object of the present invention to provide a system and method for the automated adjustment of the spherical aberration correction of the objective lenses.

An imaging system is disclosed, which includes a plurality of objective lenses, where at least one of the plurality of objective lenses has a spherical aberration collar. The plurality of objective lenses are mounted onto an objective holder, where the objective holder is configured to place the at least one of the plurality of objective lenses in an imaging position. A driving mechanism is coupled by a mechanical link to the at least one of the plurality of objective lenses, where the mechanical link is configured to transmit motion from the driving mechanism to the spherical aberration collar. A control system is configured to manipulate the driving mechanism to move the spherical aberration collar of the at least one of the plurality of objective lenses to a specific spherical aberration adjustment setting.

BRIEF DESCRIPTION OF THE DRAWINGS

These and other advantages of the present invention will become more apparent as the following description is read in conjunction with the accompanying drawings, wherein.

DETAILED DESCRIPTION OF THE INVENTION

The presently preferred embodiments of the invention are described with reference to the drawings, where like components are identified with the same numerals. The descriptions of the preferred embodiments are exemplary and are not intended to limit the scope of the invention.

Figure 1:
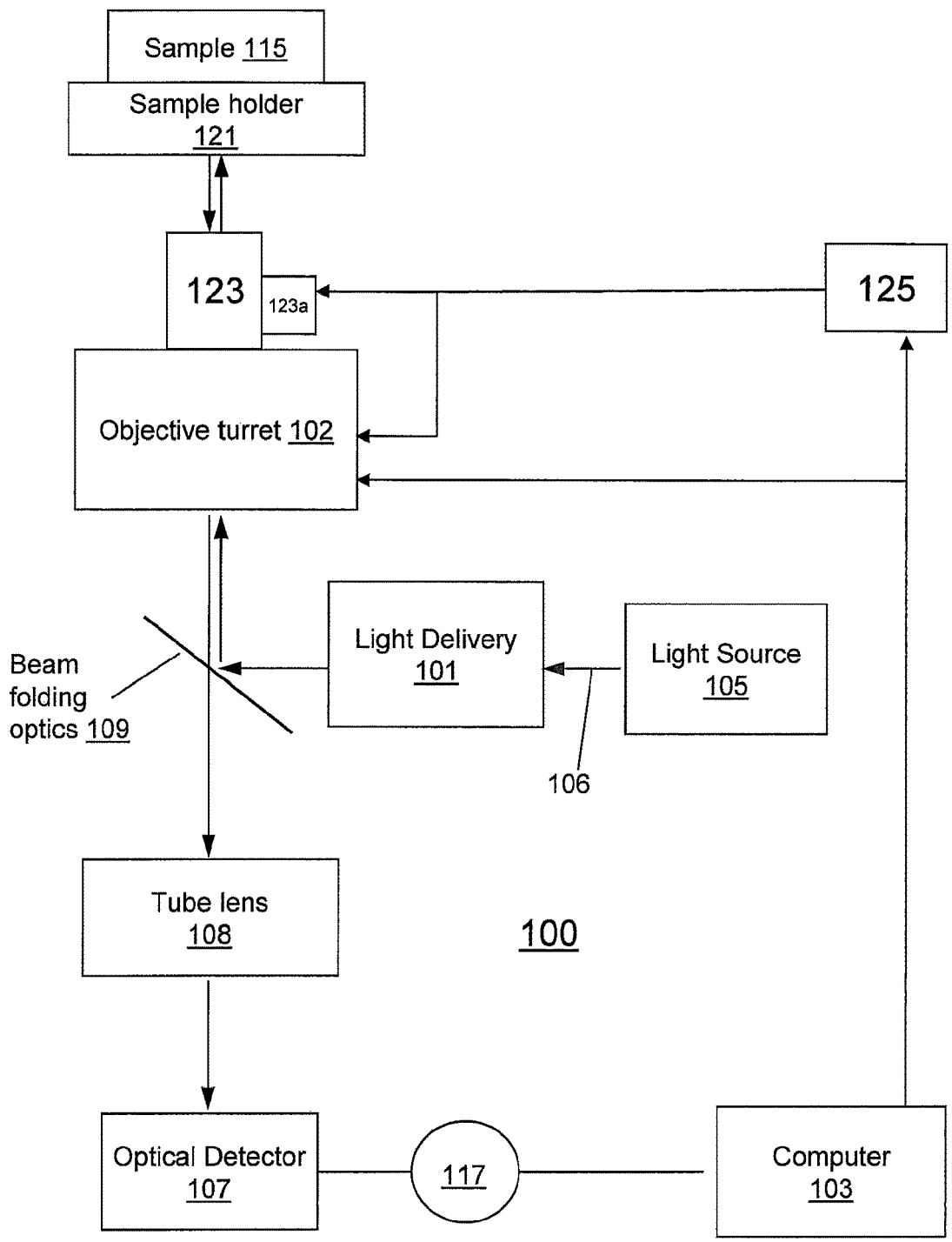
FIG. 1 illustrates a block diagram of a system for adjusting the spherical aberration of objective lenses in accordance with an embodiment of the invention.

FIG. 1 illustrates a block diagram of the essential components of a typical inverted digital microscope system that includes a system for adjusting the spherical aberration for objective lenses. This automated digital microscope system 100 is based on corrected imaging optics and includes following components: a light source 105, light delivery optics 101, beam folding optics 109, an objective turret 102 holding objective lens 123, a controller 125, sample 115, sample holder 121, tube lens 108, optical detector 107, communication link 117, and a computer 103.

In an exemplary embodiment of the invention, controller 125 includes a mechanical actuator and a driving mechanism driver (actuator driver). Driving mechanism driver may be a rotary actuator or linear actuator or any other device capable of operating the driving mechanisms 301c, 302c (FIG. 3), 404 (FIG. 404), 504 (FIG. 5) and 604 (FIG. 6). The rotary actuator may be a stepper motor, a direct current (DC) motor or a servo motor. The linear actuator may be piezo-electric motor or a solenoid. In another embodiment of the invention, the controller 125 may be mechanically linked by a wire to a controller, such as a joystick or rotary knob potentiometer, which provides a signal to adjust the spherical aberration of the objective(s) 123. The controller 125 includes a driving mechanism driver that transmit motion to respective driving mechanism 301c and 302c (FIG. 3), 404 (FIG. 4), driving mechanism 504 (FIG. 5) and driving mechanism 604 (FIG. 6).

In order to adjust a spherical aberration collar 123a of objective lens 123, a computer 103 sends a command to the controller 125 that utilizes its mechanical actuator to transmit motion through a mechanical link connected to the SA collar 123a causing the SA collar 123a to move.

The light source 105 may be a lamp, a laser, a plurality of lasers, a light emitting diode (LED), a plurality of LEDs, or any type of light source known to those of ordinary skill in the art that generates a light beam 106. The light beam 106 is delivered by the light delivery optics 101, beam-folding optics 109 and objective lens 123 to illuminate the sample 115. The light emitted or reflected from the sample 115 is collected by the objective lens 123 and an image of the sample 115 is formed by the tube lens 108 on the optical detector 107. The optical detector 107 may be a photomultiplier tube, a charged coupled device (CCD), a complementary metal-oxide semiconductor (CMOS) image detector or any optical detector utilized by those of ordinary skill in the art. Optical detector 107 is electrically or wirelessly connected by the communication link 117 to the computer 103. In another embodiment, the optical detector 107 may be replaced with a typical microscope eyepiece or oculars that work with objective 123 mounted in the objective turret 102 to further magnify intermediate image so that specimen details can be observed. Sample 115 is mounted on the sample holder 121, which may be referred to as a typical microtiter plate, a microscope slide, a chip, plate of glass, Petri dish, or any type of sample holder. The system may be used to image 2 or more sample holders with different thicknesses.

In another embodiment, the microscope system 100 may be electrically or wirelessly connected by a communication link 117 to the conventional computer 103. The communication link 117 may be any network that is able to facilitate the transfer of data between the automated microscope system 100 and the computer 103, such as a local access network (LAN), a wireless local network, a wide area network (WAN), a universal service bus (USB), an Ethernet link, fiber-optic or the like. The microscope may also have a plurality of objective lenses 111. The computer 103 may be referred to as an image receiving device 103 or image detection device 103. In another embodiment of the invention, image receiving device 103 may be located inside of the digital microscope 100. The image receiving device 103 acts as a typical computer, which is capable of receiving an image of the sample 115 from the optical detector 107, then the image receiving device 103 is able to display, save or process the image by utilizing a standard image processing software program, algorithm or equation. Also, the computer 103 may be a personal digital assistant (PDA), laptop computer, notebook computer, mobile telephone, hard-drive based device or any device that can receive, send and store information through the communication link 117. Although, one computer is utilized in this invention a plurality of computers may be utilized in place of computer 103.

The microscope system 100 has been depicted schematically in FIG. 1 with only the essential components highlighted. It will be obvious to a person skilled in the art of microscopy that the block diagram describes all microscopes using an objective lens. Examples include, but are not limited to, conventional wide-field microscope, fluorescent microscope, point confocal microscope, line scanning confocal microscope. These types of microscope may be augmented with automation equipment to serve different applications, such as high-throughput screening. However, they are not precluded from the scope of this invention. Also, the microscope system 100 may also be the INCELL™ Analyzer 1000 or 3000 manufactured by GE Healthcare in Piscataway, N.J.

Figure 2:
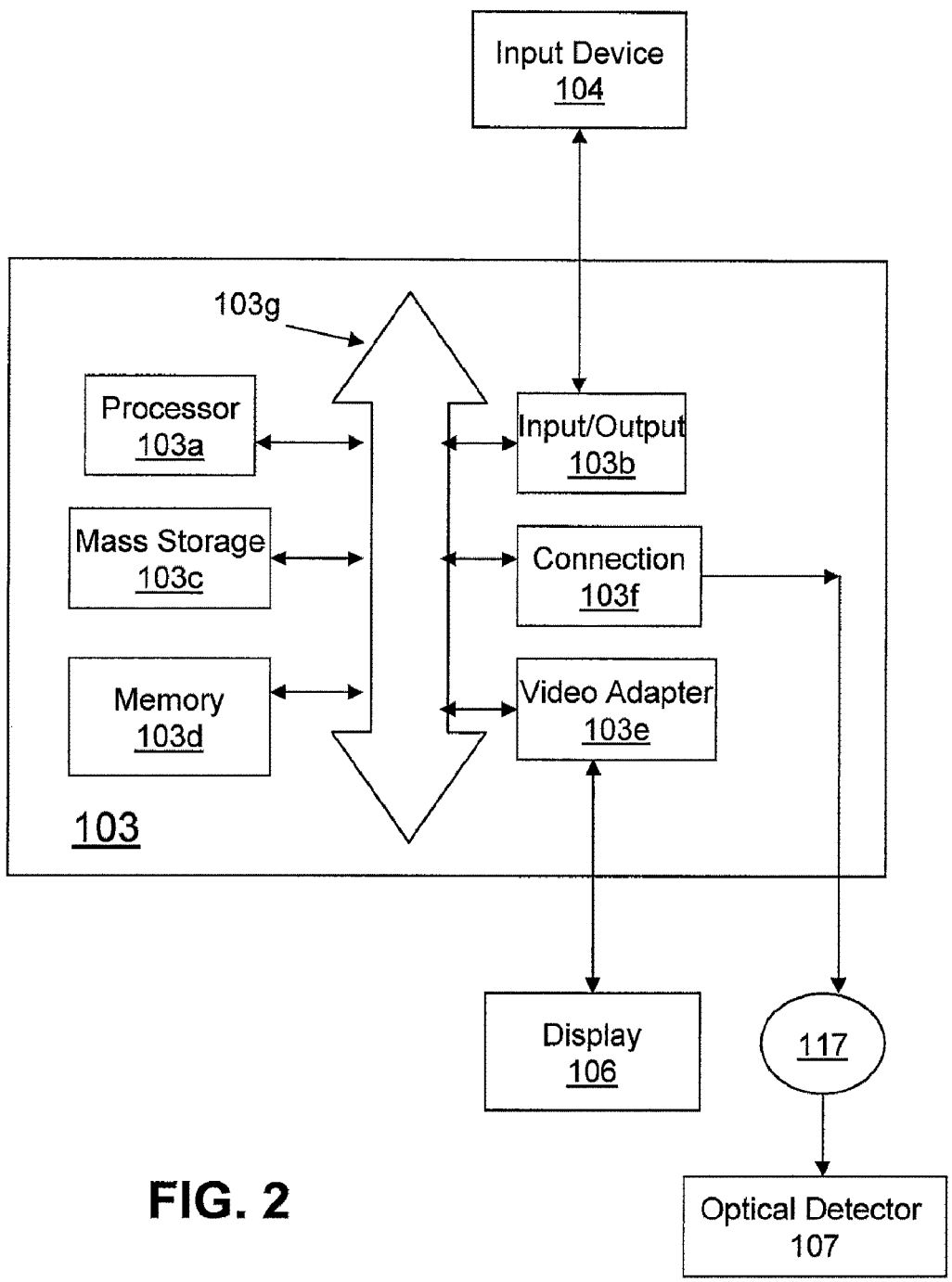
FIG. 2 is a schematic diagram of an image receiving device of FIG. 1 in accordance with the invention.

FIG. 2 illustrates a schematic diagram of the image receiving device of the digital microscope system 100 of FIG. 1. Imaging receiving device 103 includes the typical components associated with a conventional computer. The image receiving device 103 includes: a processor 103a, an input/output (I/O) controller 103b, a mass storage 103c, a memory 103d, a video adapter 103e, a connection interface 103f and a system bus 103g that operatively, electrically or wirelessly, couples the aforementioned systems' components to the processor 103a. Also, the system bus 103g, electrically or wirelessly, operatively couples typical computer system components to the processor 103a. The processor 103a may be referred to as a processing unit, a central processing unit (CPU), a plurality of processing units or a parallel processing unit. System bus 103g may be a typical bus associated with a conventional computer. Memory 103d includes a read only memory (ROM) and a random access memory (RAM). ROM includes a typical input/output system including basic routines, which assists in transferring information between components of the computer during start-up.

Input/output controller 103b is connected to the processor 103a by the bus 103g, where the input/output controller 103b acts as an interface that allows a user to enter commands and information into the computer through the spherical aberration GUI and input device 104, such as a keyboard and pointing devices. The typical pointing devices utilized are joysticks, mouse, game pads or the like. A display 106 is electrically or wirelessly connected to the system bus 103g by the video adapter 103e. Display 106 may be the typical computer monitor, plasma television, liquid crystal display (LCD) or any device capable of having characters and/or still images generated by a computer 103. Next to the video adapter 103e of the computer 103, is the connection interface 103f. The connection interface 103f may be referred to as a network interface which is connected, as described above, by the communication link 117 to the optical detector 107. Also, the image receiving device 103 may include a network adapter or a modem, which enables the image receiving device 103 to be coupled to other computers.

Above the memory 103d is the mass storage 103c, which includes: 1. a hard disk drive component (not shown) for reading from and writing to a hard disk and a hard disk drive interface (not shown), 2. a magnetic disk drive (not shown) and a magnetic disk drive interface (not shown) and 3. an optical disk drive (not shown) for reading from or writing to a removable optical disk such as a CD-ROM or other optical media and an optical disk drive interface (not shown). The aforementioned drives and their associated computer readable media provide non-volatile storage of computer-readable instructions, data structures, program modules and other data for the computer 103. Also, the aforementioned drives include the technical effect of having an algorithm for adjusting spherical aberration of the plurality of objective lenses, software or equation of this invention, which will be described in the flow chart of FIG. 7.

Within the software program for adjusting the spherical aberration of the plurality of objective lenses there is a spherical aberration graphical user interface (GUI). The spherical aberration graphical user interface is a specially programmed GUI that has some of the same functionality as a typical GUI, which is a software program designed to allow a computer user to interact easily with the computer 103. The spherical aberration GUI displays: 1. a thickness of the sample holder 121 and 2. spherical aberration adjustment settings for objective lenses 301, 302, 401, 402, 501, 502, 601 and 602. The thickness of the sample holder 121 will be based on user supplied information, which he may receive from the manufacturer of the sample holder 121. In addition, the sample 115 may be in a medium, such as gel, buffer or solution that has a depth of medium in the range of 0 to 1 mm. This depth of medium of the sample 115 in combination with the thickness of the sample holder 121 is a resulting thickness that may be used to adjust the spherical aberration collars of objective lenses 301, 302, 401, 402, 501, 502, 601 and 602. Also, the spherical aberration GUI works with the data entering device 104 (mouse, joystick, keyboard etc) to allow the user to adjust the spherical aberration adjustment settings for objective lenses 301, 302, 401, 402, 501 and 502 as discussed in FIG. 7. Spherical aberration collars 301a, 302a, 401a, 402a, 501a, 502a, 601a and 602a may also be known as spherical aberration correction collar or correction collar.

The thickness of the sample holder 121 may be based on the typical thickness of a plate, chip, microscope slide, Petri dish or a glass stored on the spherical aberration software program or entered by a user. Optionally, the user may also input a specific spherical aberration adjustment setting for the sample holder 121 into the computer 103. The typical spherical aberration adjustment settings for objective lenses 301 and 302 are also stored in the spherical aberration software program.

The spherical aberration correction system operates in one of two modes: protocol-driven and manual. In the protocol-driven mode, the spherical aberration collars 301a and 302a (FIG. 3) of respective objective lenses 301, 302 will be adjusted automatically by the spherical aberration correction system based on a protocol in the aforementioned spherical aberration software program related to a thickness of the sample holder 121 (FIG. 1) or a resultant thickness of the sample holder 121 and depth of medium of the sample 115 recorded in a protocol. For example, if the specimen holder 121 has a thickness of 0.2 mm then at least one of the spherical aberration collars of the objective lenses 301 or 302 will be adjusted to a spherical aberration setting of 0.2 mm. In the manual mode of operation, the spherical aberration correction collars of the objective lenses 301 or 302 will be adjusted to a user-defined setting that is selected via Graphical User Interface (GUI). For example, the user would use the spherical aberration Graphical User Interface (GUI) stored on computer 103 to adjust at least one of the spherical aberration collars 301a and 302a to a spherical aberration adjustment setting such as 0.2 mm based on the thickness of the sample holder 121 being 0.2 mm.

Figure 3:
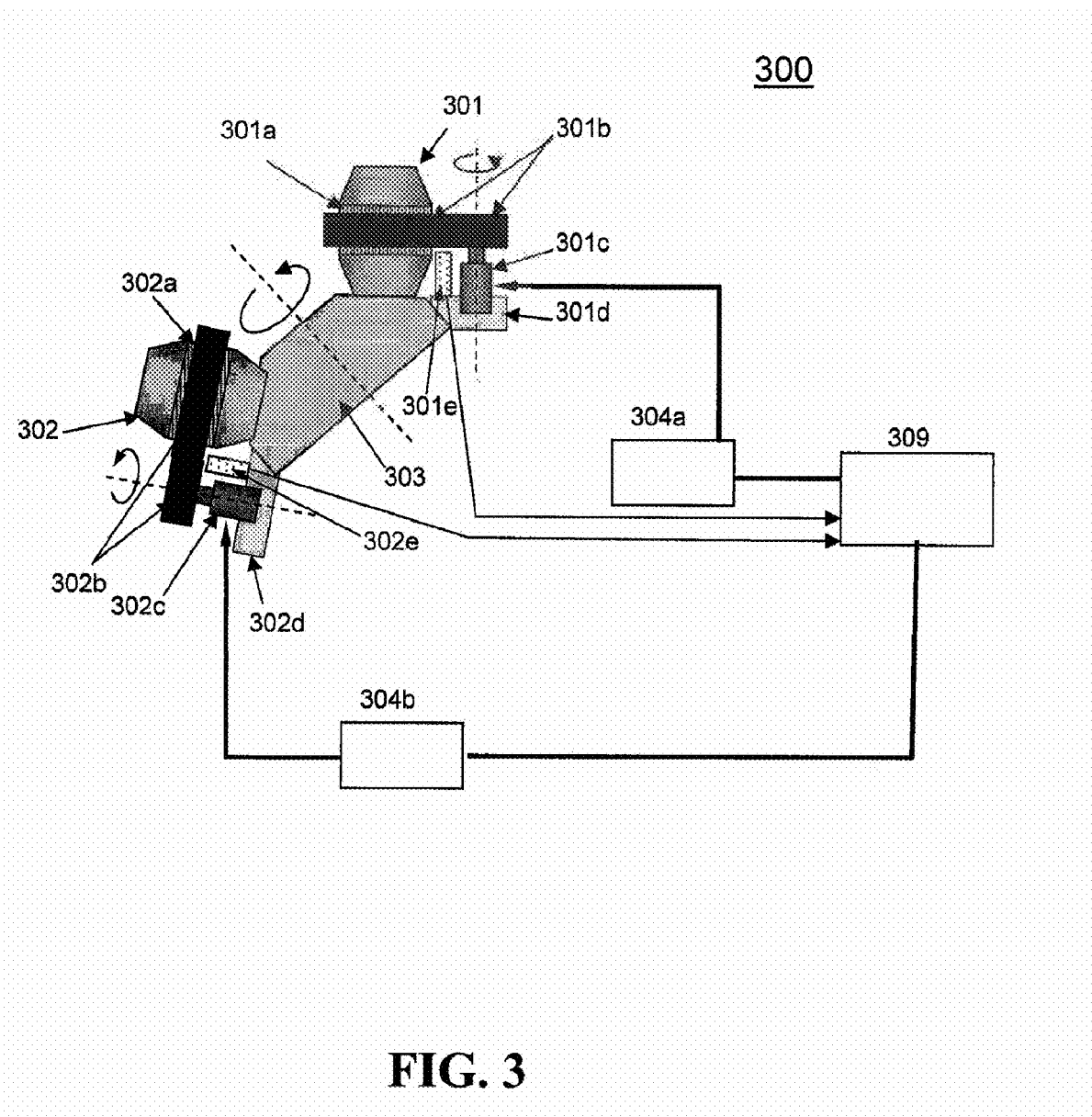
FIG. 3 illustrates an embodiment of the objective lens with an automatic spherical aberration system in accordance with the invention.

FIG. 3 shows a schematic of an embodiment of the spherical aberration adjustment system. The system 300 includes: objective lens 301, objective lens 302, an objective holder 303, a first driving mechanism 301c, a second driving mechanism 302c, a first driving mechanism mount 301d, a second driving mechanism mount 302d, a first optional position sensor 301e, a second optional position sensor 302e, a first mechanical link 301b, and a second mechanical link 302b. Objective holder 303 is the typical objective changer, such as a turret or revolver utilized in a microscope system to support the typical objective lenses 301 and 302, and to move these objectives into the imaging position. An imaging position is where the user utilizes the microscope to place either one of the objective lenses 301 or 302 so he can view an image of the sample 115. While the objective holder 303 rotates to place the desired objective in the imaging position, objective lenses 301 and 302 are always actively engaged with the respective driving mechanisms 301c and 302c. Driving mechanisms 301c and 302c can move the spherical aberration collars 301a and 302a to a spherical aberration adjustment setting, such as a setting in the typical range of about 0 to 4 mm.

Even though there are only two objective lenses, two driving mechanisms and two driving mechanism controllers shown, the number of objective lenses, driving mechanisms and driving mechanism controllers can be either increased or decreased depending on the design of a microscope or user-preferred configuration of the microscope. Objective lenses 301 and 302 are the typical objective lenses used in an automated microscope system, which may have different magnifications. For example, objective lens 301 may have a magnification of 20× and objective lens 302 may have a magnification of 60×.

The objective lenses 301 and 302 each have respective spherical aberration collars 301a and 302a. This spherical aberration adjustment system 300 is utilized to correct spherical aberration caused by the difference in the thickness of the sample holder 121 (FIG. 1), the resulting thickness of the sample holder 121 and depth of the sample 115 in the medium and the spherical aberration settings of the objective lenses 301 and 302. This invention provides a user with a simple and effective method for adjusting the spherical aberration settings of objective lenses 301 and 302 in an automatic microscope system, such as microscope system 100.

The spherical aberration correction of an objective lens of automated microscope systems can be adjusted for the specimen support thickness in a range of 0 to 4.0 mm. Also, each of the objective lenses 301 and 302 may have different spherical aberration adjustment ranges, such as objective lens 301 has settings in a range of 0-1.5 mm, objective lens 302 has settings in a range of 0-2.5 mm. For example, for Nikon, Canon CFL-PIX, product #95478 the spherical aberration corrections range of 0 to 2 mm. The setting of spherical aberration collars 301a and 302a are matched up with the thickness of the sample holder 121 or the resultant thickness of the sample holder 121 and the depth of the medium of the sample 115 for spherical adjustment correction of respective objective lenses 301 and 302. For example, if the thickness of the sample holder 121 is 1 mm, then at least one of the spherical aberration collars 301a or 302a of least one of the objective lenses 301 and 302 needs to be set to 1 mm.

Spherical aberration collars 301a and 302a of respective objective lenses 301 and 302 have a mechanical link 301b and 302b to the respective driving mechanisms 301c and 302c. Driving mechanisms 301c and 302c may also be referred to as rotary actuators that may be stepper motors, direct current (DC) motors or piezo-electric motors or other actuators known to those of ordinary skill in the art. The mechanical links transmits a rotation of the driving mechanism to the spherical aberration collars. This mechanical link may be typical mechanical gear (full or partial gear), belt or chain system, belt and pulley, friction-based spindles or other mechanisms known to those of ordinary skill in the art.

In another embodiment of the invention, spherical aberration adjustment system 300 may include typical position sensors 301e and 302e that transmit a signal about the position of respective spherical aberration collars 301a or 302a, position of the driving mechanism 304, position of the mechanical links 301b and 302b to a control system 309 to be displayed on its spherical aberration GUI.

Driving mechanism controllers 304a and 304b are respectively connected to driving mechanisms 301c and 302c, where the driving mechanism controllers 304a and 304b are equivalent to the controller 125 described above so another description will not be provided here. The driving mechanism controllers 304a and 304b are connected respectively to the driving mechanisms 301c and 302c in order to move the mechanical links 301b and 302b, which in turn move the spherical aberration collars 301a and 302a in a clockwise or counter-clockwise direction to a certain spherical aberration (adjustment) setting in a range of 0 to 4 mm. Control system 309 or the computer system 309 is connected to the driving mechanism controllers 304a and 304b and position sensors 301e and 302e. The control system 309 utilizes the signal received from the position sensors 301e and 302e to determine the current position of the spherical aberration collars 301a and 302a position of the driving mechanism 304, position of the mechanical links 301b and 302b, then the control system 309 utilizes the driving mechanism controllers 304a and 304b to stop the motion of the spherical aberration collars 301a and 302a once the required position is reached. Control system 309 is equivalent to computer 103 described above.

Figure 7:
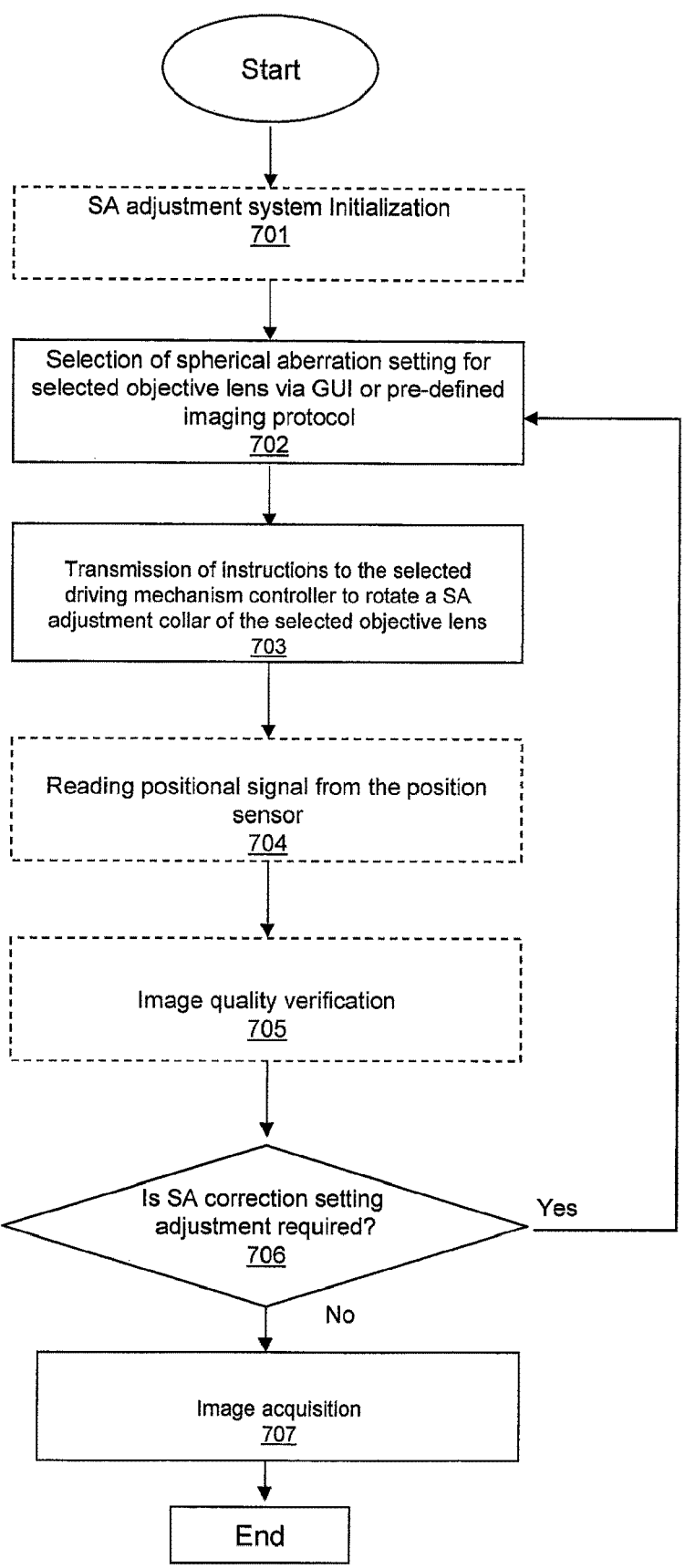
FIG. 7 depicts a flow chart of how the spherical aberration system is employed in accordance with the invention.

Referring to FIG. 1, the computer 103 is connected by a wire or wirelessly to the controller 125 whereby the computer 103 includes the software program described in FIG. 7 that sends commands to the controller 125 to move the spherical aberration collars 301a, 302a, 401a, 402a, 501a, 502a, 601a and 602a of the respective objective lenses 301, 302, 401, 402, 501, 502, 601 and 602 to a certain spherical aberration adjustment setting, such as 1 mm. In another embodiment of the invention, the computer 103 is located inside the microscope system 100 so the user can utilize the microscope system 100 to correct spherical aberration in the objective lenses 301 and 302.

Figure 4:
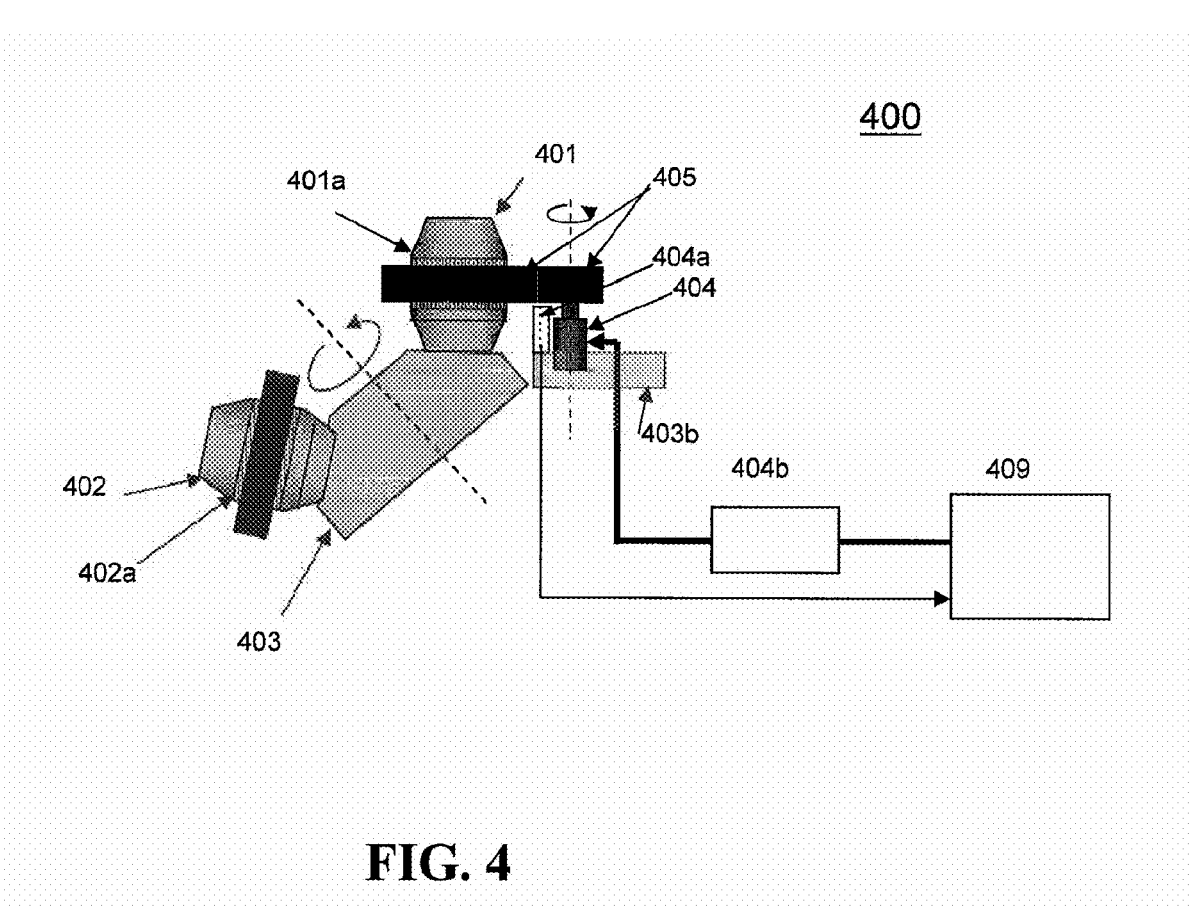
FIG. 4 illustrates another embodiment of the objective lens with an automatic spherical aberration system in accordance with the invention.

FIG. 4 shows a schematic of another embodiment of the spherical aberration (SA) adjustment system for objective lenses. The SA adjustment system 400 includes: objective lenses 401 and 402 with respective SA collars 401a and 402a, mounted on an objective changer 403 that moves the objective lenses 401 or 402 into the imaging position. Even though only two objective lenses 401 and 402 are shown here, a plurality of objective lenses can be utilized for this embodiment of the invention. A driving mechanism 404 with an optional position sensor 404a is on a platform separated from the objective changer 403, where the driving mechanism 404 is connected by a mechanical link 405 to the spherical aberration collar 402a. Position sensor 404a works in the same way similar to the position sensor 301e that transmits a signal about the position of respective spherical aberration collar 401a or 402a, position of driving mechanism 404, position of mechanical link 405 to a control system 409 to be displayed on its spherical aberration GUI. Control system 409 is equivalent to control system 409. Driving mechanism 404 is driven by a driving mechanism controller 404b that is connected to a computer 409 that provides a GUI for control of the spherical aberration settings of the spherical aberration collars 401a and 402a of the respective objective lenses 401 and 402. Driving mechanism controller 401b is equivalent to controller 125 described above.

The driving mechanism 404 is mechanically linked to the SA collar 401a or 402a of the objective lens 401 or 402 that is located in the imaging position of the microscope system 100. A mechanical link 405 coupled to the driving mechanism 404 transmits the rotation of the driving mechanism 404 to the SA collar 401a or 402a. The mechanical link 405 equivalent to mechanical links 301b and 302b can be a pair of gears, a friction-based spindle, or other mechanism for transmitting of rotation known to those of ordinary skill in the art. The driving mechanism 404 is controlled by a driving mechanism controller 404b, which receives the instructions from the control system 409. The optional position sensor 404a transmits a signal about current position of the driving mechanism 404, current position of driving mechanism 404, and current position of mechanical link 405 to the control system 409.

For this embodiment, when the user employs the typical means to rotate the objective changer 404 either the objective lens 401 or objective lens 402 is moved to the imaging position of the microscope to view the sample 115 (FIG. 1). At this imaging position, the spherical aberration collar 401a or spherical aberration collar 402a are engaged with the driver mechanism 404 through the mechanical link 405. Next, the driver mechanism 404 is able to move the mechanical link 405, which in turns moves the respective spherical aberration collar 401a or 402a in a clockwise or counter-clockwise direction to a specific spherical aberration adjustment setting. The accuracy of the spherical aberration adjustment may be controlled by monitoring the signal from the position sensor 404a at the spherical aberration GUI on the computer 103. The driving mechanism 404 is controlled by the driving mechanism controller 404b and the control system 409 or solely controlled by the driving mechanism controller 404b to move the spherical aberration collar 401a or 402a of the objective lenses 401 or 402 located in the imaging position to a particular spherical aberration adjustment setting that may be anywhere in the range of 0-4 mm.

The main differences of this embodiment from the one described before:
- only one driving mechanism and driving mechanism controller is required to adjust the SA correction setting for all objective lenses installed in the microscope 100;
- the SA adjustment is performed in a sequential order, i.e. only one objective lens is adjusted at the time;
- this system allows one to set the SA correction setting independently for each objective lens.

Figure 5:
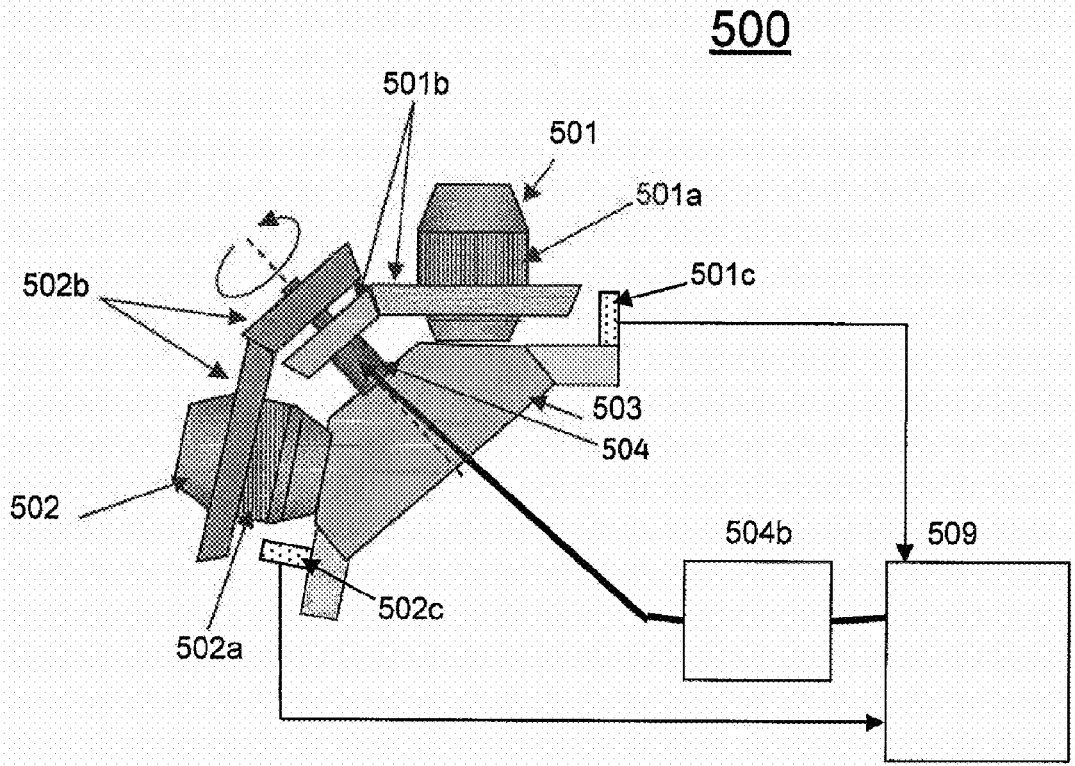
FIG. 5 illustrates another embodiment of the objective lens with an automatic spherical aberration system in accordance with the invention.
Figure 6:
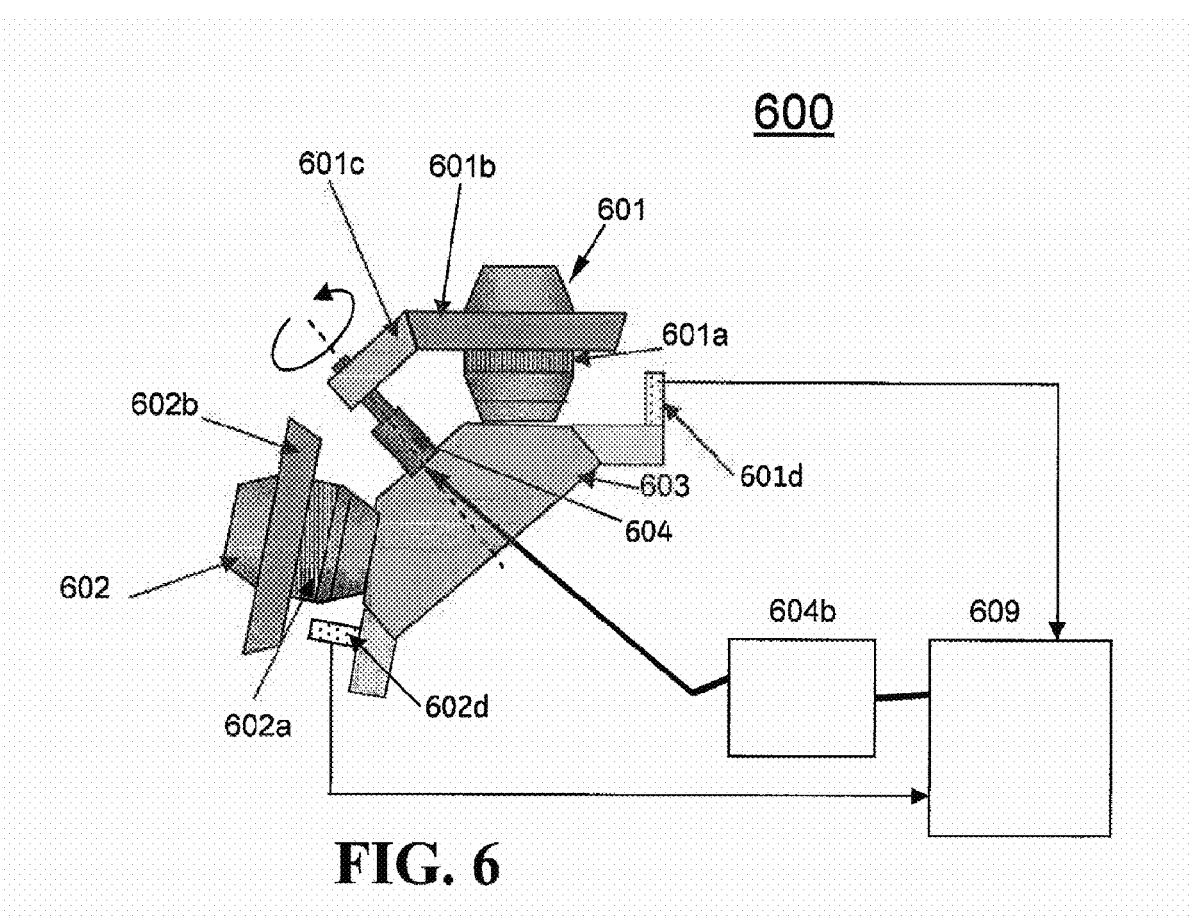
FIG. 6 shows a schematic of another embodiment of the spherical aberration adjustment system for objective lenses.

FIG. 5 shows a schematic of another embodiment of the SA adjustment system for objective lenses. The SA adjustment system 500 includes: objective lenses 501 and 502 with SA collars 501a and 502a, mounted on an objective changer 503 that moves the objective lenses 501 or 502 into the imaging position. Even though only two objective lenses 501 and 502 are shown here, a plurality of objective lenses can be utilized for this embodiment of the invention. A driving mechanism 504 with optional position sensors 501c and 502c are mounted on the objective changer 503. Position sensor 501c and 502c works in the same way similar to the position sensor 301e that transmits a signal about the position of respective spherical aberration collar 501a or 502a, position of the driving mechanism 504 and position of the mechanical links 501b and 502b to the control system 509 to be displayed on its spherical aberration GUI. Control system 509 is equivalent to computer 103 discussed above. The driving mechanism 504 is driven by a driving mechanism controller 504b, that is connected to a control system 509 that provides a GUI for control of the spherical aberration settings of the objective lenses 501 and 502.

The driving mechanism 504 is mechanically linked to SA collars 501a and 502a of all objective lens of the microscope such as objective 501 and 502 that have spherical aberration collars. The mechanical links 501b and 502b can be a pair of gears, belts, a friction-based spindle, or other mechanism for transmitting of rotation known to those of ordinary skill in the art. Since the angular range of the SA adjustments of objective lenses 501 and 502 may be different, the angular transmission ratio of the mechanical links 501b and 502b should match the rotation range of the driving mechanism 504 with SA adjustment ranges of the objective lenses 501 and 502 via the proper selection of gear ratio as known by a person of ordinary skill in the art. For example, the gear ratio of mechanical link 501b may be 1 and the gear ratio of mechanical link 502b may be 0.5, where the mechanical link 501b rotates the spherical aberration collar 501a 1 full turn while simultaneously the mechanical link 502b rotates the spherical aberration collar 502a a ½ turn. The driving mechanism is controlled by a driving mechanism controller 504b, which receives the instructions from the control system 509.

For this embodiment, the user utilizes the spherical aberration GUI of driving mechanism controller 504b in a predefined image and protocol to simultaneously set the spherical aberration collars 501a and 502a to a specific spherical aberration setting to view the sample 115 (FIG. 1). The mechanical links 501b and 502b are respectively engaged with the driver mechanism 504, whereby the driver mechanism 504 is able to simultaneously move the mechanical links 501b and 502b, which in turns simultaneously moves the respective spherical aberration collars 501a and 502a to a specific spherical adjustment setting or position. The accuracy of movement of the driving mechanism 504 can be monitored by the signal from the position sensors 501c and 502c at the spherical aberration GUI on the control system 509.

The main features of this embodiment are:
only one driving mechanism and driving mechanism controller is required to adjust the SA correction setting for all objective lenses of the microscope;
the SA adjustment is performed simultaneously for all objective lenses connected to the driving mechanism;
this system allows one to synchronize the SA correction setting for all of the objective lenses.

FIG. 6 shows a schematic of another embodiment of the SA adjustment system for objective lenses. The SA adjustment system 600 includes: objective lenses 601 and 602 with respective SA collars 601a and 602a, mounted on an objective changer 603 that moves the objective lenses 601 or 602 into the imaging position. Even though only two objective lenses 601 and 602 are shown here, a plurality of objective lenses can be utilized for this embodiment of the invention. Objective changer 603 also includes optional position sensors 601d and 602d, and driving mechanism 604. Position sensors 601d and 602d work the same way as the position sensor 301e such that they transmit a signal about the position of respective spherical aberration collar 601a or 602a and position of the driving mechanism 604 to the control system to be displayed on its spherical aberration GUI. The driving mechanism 604 is driven by a driving mechanism controller 604b, where the driving mechanism controller 604b is connected to a control system 609 that provides a GUI for controlling the spherical aberration settings of the objective lenses 601 and 602. Driving mechanism controller 604b is equivalent to driving mechanism controller 304a while the control system 609 is similar to control system 409.

The driving mechanism 604 is mechanically linked to SA collars 601a and 602a of all objective lens 601 and 602 of the microscope 100 by the respective mechanical links 601b, 601c and 602b. The mechanical links 601b, 602b and 601c can be gears, a friction-based spindle, or other mechanism for transmitting of rotation known to those of ordinary skill in the art. Mechanical link 601c can be a partial gear such that it only engages one SA collar 601a or 602a at a time.

For this embodiment, the user utilizes the spherical aberration GUI of driving mechanism controller 604b to adjust or move the spherical aberration collars 601a and 602a in a clockwise or counter-clockwise direction to a specific spherical aberration setting to view the sample 115 (FIG. 1). The driving mechanism controller 601b may utilize the mechanical link 601c as a partial gear, whereby one of the SA collars 601a or 602a is engaged. If the mechanical link 601c is used as a partial gear to move the SA collar 601a, then the mechanical link 601c only engages the mechanical link 601b with the driver mechanism 604 to move the SA collar 601a. If the mechanical link 601c is used as a partial gear to move the SA collar 602a, then the mechanical link 601c engages the mechanical link 602b with the driver mechanism 604 to move the SA collar 602a. The accuracy of movement of the driving mechanism 604 can be monitored by the signal from the position sensor 604a at the spherical aberration GUI on the control system 609.

The main features of this embodiment are:
only one driving mechanism and driving mechanism controller is required to adjust the SA correction setting for all objective lenses of the microscope;
this system allows one to synchronize the SA correction setting for all of the objective lenses; and
this system allows one to engage and move only one SA collar at a time for each of the objective lenses.

FIG. 7 depicts a flow chart of how the spherical aberration adjustment system is employed. The description is provided for a single objective lens adjustment; however a similar procedure may be employed for multiple objective lenses system.

At block 701, the SA adjustment system is initialized. The initialization procedure may include a movement of SA collars of the objective lens into a well-defined starting position or initial position such as a minimal or maximal spherical aberration (adjustment) setting. The minimal setting may be anywhere in a range of 0-1.0 mm and the maximum setting is anywhere in a range of 1.1-2.5 mm. The starting position may be defined by implementation of end switch that provides an electrical signal when the collar or a driving actuator is in the starting position. If the SA adjustment system does not have a position sensor, all further movements of the SA collar are performed relative to the starting position. If the SA adjustment system has a position sensor, the homing procedure may not be required since the position sensor provides information about the absolute position of the collar or the driving actuator.

At block 702, the required setting of the SA collar is defined. In one embodiment of the invention, the system operates in a manual or user-controlled mode; a user is able to adjust spherical aberration settings of the objective lens or lenses, such as objective lenses 301 or 302 via driving mechanism controllers 304a and 304b and the GUI on control system 309 that controls the microscope system 100. In the user-controlled mode, a user utilizes the spherical aberration graphical user interface with input device 104 of the control system 309 to change SA setting of any one, two or all of the objective lenses 301 or 302 to a specific value, for example in a range of about 0 to 4 mm. Also, the user may utilize control system 309 to simultaneously move at least two or more of the spherical aberration collars 301a or 302a of the respective objective lenses 301 or 302 to a specific spherical aberration adjustment setting.

Before the user inputs a spherical aberration adjustment setting, the spherical aberration adjustment settings for respective objective lenses 301 and 302 are displayed on the spherical aberration graphical user interface on control system 309. Also, the thickness of the sample holder 121 (FIG. 1) may be entered with the input device 104 by the user, which is displayed on the spherical aberration GUI. For example, the control system 309 would read the spherical aberration adjustment setting of objective lens 301 at position sensor 301c to be 0.5 mm and the thickness of the sample holder 121 as entered by the user to be 1 mm. Thus, the user would be able to match the spherical aberration setting of objective lens 301 with the displayed thickness of the sample holder 121. This movement of the spherical aberration collars 301a and 302a is based an equation or algorithm discussed above that relies on the entered and displayed thickness of 0.5 mm for the sample holder 121 or the resultant thickness of the sample holder and the depth of medium of the sample 115 to correct spherical aberration of objective lenses 301 and 302.

In another embodiment of the invention, the user employs the graphical user interface of the control system 409 to transmit a signal to the driving mechanism controller 404b to move either one of the spherical aberration collars 401a or 402a (FIG. 4) of objective lenses 401 or 402 to a certain spherical aberration adjustment setting, such as 0.3 mm based on the spherical aberration GUI displayed thickness of 0.3 mm for the sample holder 121 to correct spherical aberration of objective lenses 401 or 402. This movement of the spherical aberration collars 401a and 402a is based an equation or algorithm discussed above that relies on the entered and displayed thickness of 0.3 mm for the sample holder 121 or the resultant thickness of the sample holder and the depth of medium of the sample 115 to correct spherical aberration of objective lenses 401 and 402.

In yet another embodiment of the invention, the user employs the graphical user interface of the control system 509 to simultaneously move spherical aberration collars 501a and 502a of respective objective lenses 501 and 502 (FIG. 5) to the same spherical aberration adjustment setting, such as 0.2 mm based on the displayed thickness of 0.2 mm for the sample holder 121 to correct spherical aberration of objective lens 501 and 502. This movement of the spherical aberration collars 501a and 502a is based on equation or algorithm discussed above that relies on the entered and displayed thickness of 0.2 mm for the sample holder 121 or the resultant thickness of the sample holder and the depth of medium of the sample 115 to correct spherical aberration of objective lenses 501 and 502.

In another embodiment of the invention, the user employs the graphical user interface of the control system 609 to separately move spherical aberration collars 601a and 602a of respective objective lenses 601 and 602 (FIG. 6) to the same or different spherical aberration adjustment settings, such as 0.2 mm. This movement of the spherical aberration collars 601a and 602a is based on equation or algorithm discussed above that relies on the entered and displayed thickness of 0.2 mm for the sample holder 121 or the resultant thickness of the sample holder and the depth of medium of the sample 115 to correct spherical aberration of objective lenses 601 and 602.

In yet another embodiment of the invention, or a protocol-driven mode of operation, the automated microscope system 100 will automatically adjust the spherical aberration settings of the objective lenses 301 and 302 based on an imaging protocol which includes the thickness of sample holder being used in the protocol that are stored on the software program of the control system 309 or the microscope system 100. The spherical aberration correction system algorithm, software, equation or the imaging protocols may be stored in the processor 103a, memory 103d or any other part of the image receiving device 103 known to those of ordinary skill in the art. In yet another embodiment, the spherical aberration correction system software, algorithm or equation is stored on any type of computer-readable medium that includes computer-executable instructions. The computer-readable medium includes a floppy disk, optical disc, digital video disc; computer disk read only memory (CD-ROM) and the like.

In another embodiment of the invention, a user may be able to utilize an alternative input device (non personal computer based device) to enter user-defined SA correction settings, such as a joystick, rotary knob potentiometer, or any other controller known to those of ordinary skill in the art that provides a control signal to the driving mechanism controllers 125, 304a, 304b, 404b, 504b or 604b to adjust the spherical aberration of objective lenses 301, 302, 401, 402, 501, 502, 601 and 602.

At block 703, the instruction to move the SA collar to a specific position defined at block 702 is transmitted to the driving mechanism controller that in turn moves the driving mechanism that transmits motion from the driving mechanism to the SA collar that rotates the SA collar in a clockwise or counter-clockwise direction. In an embodiment of the invention, at least one of the driving mechanism controllers 304a or 304b (FIG. 3) receives the signal from the computer 103 to move any one, two, three or all spherical aberration collars 301a or 302a of objective lenses 301, and 302 to a spherical aberration adjustment setting of 1 mm.

At least one of the driving mechanism controllers 304a or 304b (FIG. 3) transmits instructions by its driving mechanism drivers to any or multiple driving mechanisms 301c or 302c that utilizes mechanical links 301b or 302b to move any one, two spherical aberration collars 301a or 302a to a specific spherical aberration adjustment setting. The driving mechanisms 301c or 302c can simultaneously move spherical aberration collar 301a and 302a to the same or different spherical aberration adjustment setting so that each of the objective lenses 301 and 302 will have the same or different spherical aberration adjustment settings. For example, the spherical aberration adjustment setting for objective lens may be 0.4 mm and 0.4 mm for objective lenses 301 and 302. When any one, two of the driving mechanisms 301c and 302c receive the signal from the driving mechanism controllers 304a and 304b then any one, two mechanical links 301b and 302b become engaged or in contact with the respective spherical aberration collars 301a and 302a. The spherical aberration mechanical links 301b and 302b manipulate or move the spherical aberration collars 301a and 302a to a particular spherical aberration adjustment setting or position, for example from 0.5 mm to 1 mm.

In another embodiment of the invention, the driving mechanism controller 404b receives the signal from the computer 103 to move either spherical aberration collars 401a or 402a (FIG. 4) to a spherical aberration adjustment setting or position of 0.3 mm. At this point, the control system 409 would move either objective lenses 401 or 402 to an imaging position, whereby the spherical aberration mechanical link 405 will be engaged with the spherical aberration collars 401a or 402a. The driving mechanism controller 404b transmits instructions by its driving mechanism driver to the driving mechanism 404 that moves spherical aberration collars 401a or 402a to a specific spherical aberration adjustment setting. Driving mechanism 404 utilizes the mechanical link 405 that receives the signal from the driving mechanism controller 404b, then the either of the objective lenses 401 or 402 moves into the imaging position, where mechanical link 405 becomes engaged or in contact with the respective spherical aberration collars 401a or 402a. The engagement between the mechanical link 405 and the spherical aberration collars 401a or 402a depends on which one of the objective lenses 401 or 402 is at the imaging position to manipulate or move the spherical aberration collars 401a or 402a in a clockwise or counter-clockwise direction to a certain spherical aberration adjustment setting, for example from 0.1 mm to 0.3 mm.

In yet another embodiment of the invention, the driving mechanism controller 504b receives the signal from the computer 509 to simultaneously move spherical aberration collars 501a and 502a (FIG. 5) of respective objective lenses 501 and 502 to equivalent spherical adjustment setting or positions of 0.2 mm. Driving mechanism controller 504b transmits instructions through its driving mechanism driver to driving mechanism 504 to move spherical aberration collar 501a and 502a to a specific spherical aberration adjustment setting. When the driving mechanism 504 receives the signal from the driving mechanism controller 504b, then the driving mechanism 504 utilizes the mechanical links 501b and 502b to simultaneously become engaged or in contact with the respective spherical aberration collars 501a and 502a to simultaneously manipulate or move the spherical aberration collars 501a and 502a to certain spherical aberration settings, for example from 0.1 mm to 0.2 mm.

In another embodiment of the invention, the driving mechanism controller 604b receives the signal from the computer 609 to simultaneously move spherical aberration collars 601a and 602a (FIG. 6) of respective objective lenses 601 and 602 to equivalent spherical adjustment setting or positions of 0.2 mm. Driving mechanism controller 604b transmits instructions through its driving mechanism driver to driving mechanism 604 to move spherical aberration collar 601a and 602a to a specific spherical aberration adjustment setting. When the driving mechanism 604 receives the signal from the driving mechanism controller 604b, then the driving mechanism controller 604b moves each SA collar 601a and SA collar 602a to the same or different spherical adjustment settings or positions. Driving mechanism controller 604b transmits instructions through its driving mechanism driver to driving mechanism 604 to move spherical aberration collar 601a to a specific spherical aberration adjustment setting. When the driving mechanism 604 receives the signal from the driving mechanism controller 604b, then the driving mechanism 604 utilizes the mechanical links 601b and 601c to become engaged or in contact with the respective spherical aberration collar 601a to manipulate or move the spherical aberration collars 601a to certain spherical aberration settings, for example from 0.1 mm to 0.2 mm. Next, driving mechanism controller 604b may transmit instructions through its driving mechanism driver to driving mechanism 604 to move spherical aberration collar 602a to a specific spherical aberration adjustment setting. When the driving mechanism 604 receives the signal from the driving mechanism controller 604b, then the driving mechanism 604 utilizes the mechanical links 602b and 601c to become engaged or in contact with the respective spherical aberration collar 602a to manipulate or move the spherical aberration collars 602a to certain spherical aberration settings, for example from 0.1 mm to 0.2 mm At optional block 704, the spherical aberration adjustment system utilizes the control system 309 in combination with respective optional position sensors 301e and 302e to determine the current spherical aberration adjustment setting of the respective objective lenses 301 and 302. In an embodiment of the invention, when any one or two of the spherical aberration collars 301a and 302a move to a particular spherical aberration adjustment setting, such as 1 mm, then the optional position sensors 301e and 302e transmits positional signals to the control system 309 of the adjusted spherical aberration adjustment setting. Control system 309 displays the new spherical aberration adjustment setting of 1 mm of any one, two, three or four of the objective lenses 301 and 302, for example objective lens 301 has a spherical aberration adjustment setting of 2 mm. In another example, the objective lenses 301 and 302 have a spherical aberration adjustment setting of 2 mm.

In another embodiment of the invention, when either one of the spherical aberration collars 401a or 402a are moved to a particular spherical aberration adjustment setting, such as 2 mm, then the position sensor 404a transmits this position to the control system 409 of the adjusted setting. Control system 409 displays the new spherical aberration adjustment setting of 2 mm of either objective lenses 401 or 403.

In yet another embodiment of the invention, when both spherical aberration collars 501a and 502a have been simultaneously moved to a particular spherical aberration adjustment setting, such as 0.2 mm, then the position sensors 501c and 502c informs control system 509 of the changed position. Control system 509 displays the new spherical aberration adjustment setting at spherical aberration at GUI, for example the spherical aberration adjustment setting for objective lens 501 will be shown to be 0.2 mm on control system 509.

At the optional block 705, an image quality verification is performed. In an embodiment of the invention, the image quality verification is performed to validate the SA collar positions 301a, 302a, 401a, 402a, 501a, 502a, 601a and 602a on respective objective lenses 301, 302, 401, 402, 501, 502, 601 and 602 when the user will view the displayed image of the sample specimen 115 on the spherical aberration GUI on control system 309, 409, 509 and 609.

At block 706, user may change the SA setting for the selected objective. This change may be required for:
    optimization of the SA setting if an iterative SA adjustment procedure is implemented;
    adjustment of the SA setting for next image during z-stack acquisition;

At block 706, the user has not taken the final image. The process is still in a stage where we are validating the setting of SA collars 301a, 302a, 401a, 402a, 501a, 502a, 601a and 602a on respective objective lenses 301, 302, 401, 402, 501, 502, 601 and 602. Once the user or algorithm is happy with the SA collar setting, then only the final image can be taken at block 707.

If the SA collar setting is changed, then the process goes to block 702. If the SA collar setting is not changed, then the process continues at block 707, final image is taken and stored and this image will be used for the purpose of biological experiment then the process ends.

This invention provides an automatic system and method that allows a user to adjust the spherical aberration correction setting for objective lenses in a microscope system in order to optimize the spherical aberration correction of the objective lenses for specific imaging conditions. The user is able to determine the spherical aberration adjustment setting for each of the objective lenses in the microscope system, and then adjust the spherical aberration correction for each of the objective lenses to correct the spherical aberration. Thus, this invention provides the user with a means to correct the spherical aberration in objective lenses so the user will be able to view a clear image of the sample specimen.

It is intended that the foregoing detailed description of the invention be regarded as illustrative rather than limiting and that it be understood that it is the following claims, including all equivalents, which are intended to define the scope of the invention.

What is claimed is:

1. An apparatus for controlling spherical aberration in an imaging system comprising:
   a plurality of objective lenses, wherein at least one of the plurality of objective lenses has a spherical aberration collar;
   the plurality of objective lenses mounted onto a objective holder, wherein the objective holder is configured to place the at least one of the plurality of objective lenses in an imaging position;
   a plurality of driving mechanisms, wherein at least one of the plurality of driving mechanisms is coupled by a mechanical link to the at least one of the plurality of objective lenses, wherein the mechanical link is configured to transmit motion from at least one of the plurality of driving mechanisms to the spherical aberration collar of the at least one of the plurality of objective lenses; and
   a plurality of driving mechanism controllers, wherein at least one of the plurality of driving mechanism controllers is configured to manipulate at least one of the plurality of driving mechanisms to move the spherical aberration collar of the at least one of the plurality of objective lenses in the imaging position to a specific spherical aberration adjustment setting.

2. The apparatus of claim 1, wherein the plurality of driving mechanism controllers includes a driving mechanism driver that manipulates the at least one of the plurality of driving mechanisms.

3. The apparatus of claim 2, wherein the driving mechanism is a rotary actuator.

4. The apparatus of claim 3, wherein the rotary actuator is selected from the group consisting of a stepper motor, a DC motor and a servo motor.

5. The apparatus of claim 2, wherein the driving mechanism is a linear actuator.

6. The apparatus of claim 5, wherein the linear actuator is a piezo-electric actuator.

7. The apparatus of claim 1, wherein the mechanical link is selected from the group consisting of a mechanical gear, chain system, belt and pulley or friction-based spindle.

8. The apparatus of claim 1, wherein the mechanical link is configured to be engaged with the spherical aberration collar of the at least one of the plurality of objective lenses in order to move the spherical aberration collar.

9. The apparatus of claim 1, wherein the at least one of the plurality of driving mechanism controllers is configured to manipulate the at least one of the plurality of driving mechanisms to move the spherical aberration collar of the at least one of the plurality of objective lenses based on a thickness of a sample holder.

10. The apparatus of claim 1, wherein the at least one of the plurality of driving mechanism controllers is configured to manipulate the at least one of the plurality of driving mechanisms to move the spherical aberration collar of the at least one of the plurality of objective lenses based on a resultant thickness of a thickness of a sample holder and a depth of medium of a sample.

11. The apparatus of claim 1, wherein a control system is connected to the at least one driving mechanism controller of the plurality of driving mechanism controllers in order to manipulate the at least one of the plurality of driving mechanisms to move the spherical aberration collar of the at least one of the plurality of objective lenses.

12. The apparatus of claim 1, further comprising a plurality of position sensors located on the objective changer.

13. The apparatus of claim 12, wherein the plurality of position sensors are configured to transmit a signal to the control system concerning a current position of the at least one spherical aberration collar on the plurality of objective lenses.

14. An apparatus for controlling spherical aberration in an imaging system comprising:
   a plurality of objective lenses, wherein at least one of the plurality of objective lenses has a spherical aberration collar;
   the plurality of objective lenses mounted onto a objective holder, wherein the objective holder is configured to place the at least one of a plurality of objective lenses in an imaging position;
   a driving mechanism coupled by a mechanical link to the at least one of the plurality of objective lenses, wherein the mechanical link is configured to transmit motion from the driving mechanism to the spherical aberration collar of the at least one of the plurality of objective lenses; and
   a driving mechanism controller configured to manipulate the driving mechanism to move the spherical aberration collar of the at least one of the plurality of objective lenses in the imaging position to a specific spherical aberration adjustment setting.

15. An apparatus for controlling spherical aberration in an imaging system comprising:
   a plurality of objective lenses, wherein at least one of the plurality of objective lenses has a spherical aberration collar;
   the plurality of objective lenses mounted onto a objective holder, wherein the objective holder is configured to place the at least one of a plurality of objective lenses in an imaging position;
   a driving mechanism coupled by a plurality of mechanical links to the to the plurality of objective lenses, wherein each of the plurality of mechanical links have an angular transmission ratio that is configured to transmit motion from the driving mechanism to each spherical aberration collar of the plurality of objective lenses; and
   a driving mechanism controller configured to manipulate the driving mechanism to simultaneously move each spherical aberration collar of the plurality of objective lenses to a specific spherical aberration adjustment setting, wherein at least one of the spherical objective lenses is in the imaging position.

* * * * *